United States Patent
Maxwell

(10) Patent No.: US 9,507,040 B2
(45) Date of Patent: Nov. 29, 2016

(54) SEISMIC SENSOR CABLE TAKEOUT

(71) Applicant: CGG SERVICES SA, Massy (FR)

(72) Inventor: Peter Maxwell, Missouri City, TX (US)

(73) Assignee: CGG SERVICES SA, Massy (FR)

(*) Notice: Subject to any disclaimer, the term of this patent is extended or adjusted under 35 U.S.C. 154(b) by 396 days.

(21) Appl. No.: 14/170,741

(22) Filed: Feb. 3, 2014

(65) Prior Publication Data

US 2014/0305222 A1    Oct. 16, 2014

Related U.S. Application Data

(60) Provisional application No. 61/810,398, filed on Apr. 10, 2013.

(51) Int. Cl.
*G01V 1/16* (2006.01)
*G01S 7/521* (2006.01)

(52) U.S. Cl.
CPC .............. *G01V 1/162* (2013.01); *G01S 7/521* (2013.01)

(58) Field of Classification Search
CPC ...... G01S 7/521; G01V 1/166; G01V 1/162; G01V 1/52
USPC .................................. 367/188, 178
See application file for complete search history.

(56) References Cited

U.S. PATENT DOCUMENTS

| | | | |
|---|---|---|---|
| 2,477,172 A | 7/1949 | Brownlow | |
| 2,908,890 A | 10/1959 | Campbell et al. | |
| 3,866,162 A | 2/1975 | Florian | |
| 3,930,218 A * | 12/1975 | Hall, Jr. | G01V 1/16 174/561 |
| 3,931,453 A | 1/1976 | Hall, Jr. | |
| 3,993,859 A | 11/1976 | McNeel | |
| 4,117,449 A * | 9/1978 | McNeel | G01V 1/181 174/541 |
| 4,637,001 A | 1/1987 | Annoot | |
| 4,917,632 A | 4/1990 | Smith | |
| 5,010,531 A | 4/1991 | McNeel | |
| 5,014,813 A * | 5/1991 | Fussell | G01V 1/181 181/122 |
| 5,189,642 A * | 2/1993 | Donoho | G01V 1/38 181/122 |
| 5,253,223 A * | 10/1993 | Svenning | G01V 1/16 181/122 |
| 5,341,348 A | 8/1994 | Farris | |
| 5,475,652 A | 12/1995 | McNeel et al. | |
| 7,260,024 B2 | 8/2007 | Goujon et al. | |
| 8,000,171 B2 | 8/2011 | Hache et al. | |
| 2004/0257913 A1* | 12/2004 | Ray | G01V 1/16 367/188 |

OTHER PUBLICATIONS

"UniQ Land Seismic Acqusition System", Online Overview, 2013, (http://www.slb.com/services/westerngeco/services/land/technologies/uniq.aspx).

* cited by examiner

*Primary Examiner* — Ian J Lobo
(74) *Attorney, Agent, or Firm* — Patent Portfolio Builders PLLC

(57) ABSTRACT

A device includes a housing in which a seismic sensor module is at least partially housed, a cable connected to the seismic sensor module, and, a takeout through which the cable extends from the housing. The takeout is operable between a first configuration in which the cable extends vertically from the housing and a second configuration in which the cable extends horizontally from the housing.

15 Claims, 5 Drawing Sheets

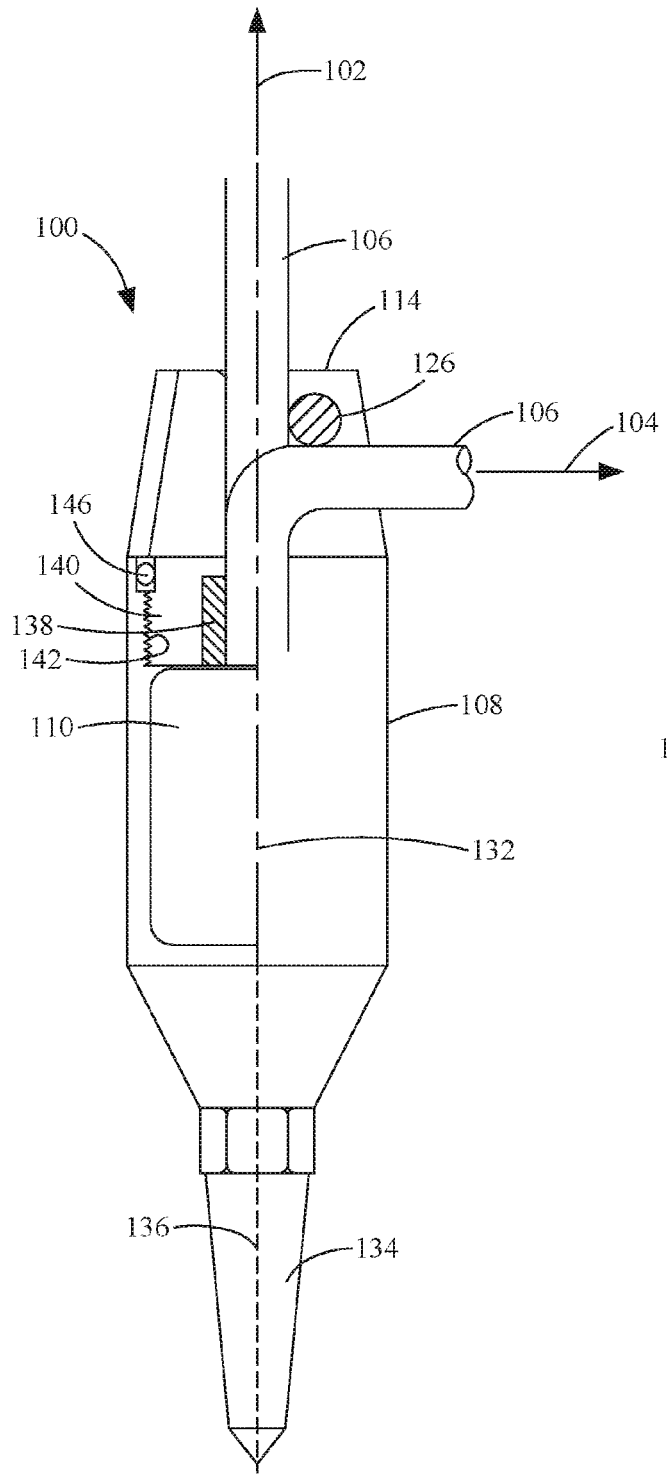
Figure 1
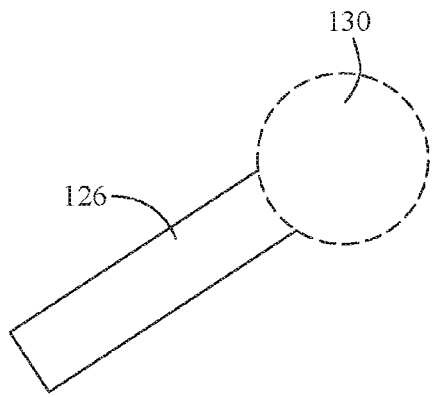
Figure 3
Figure 4
Figure 5

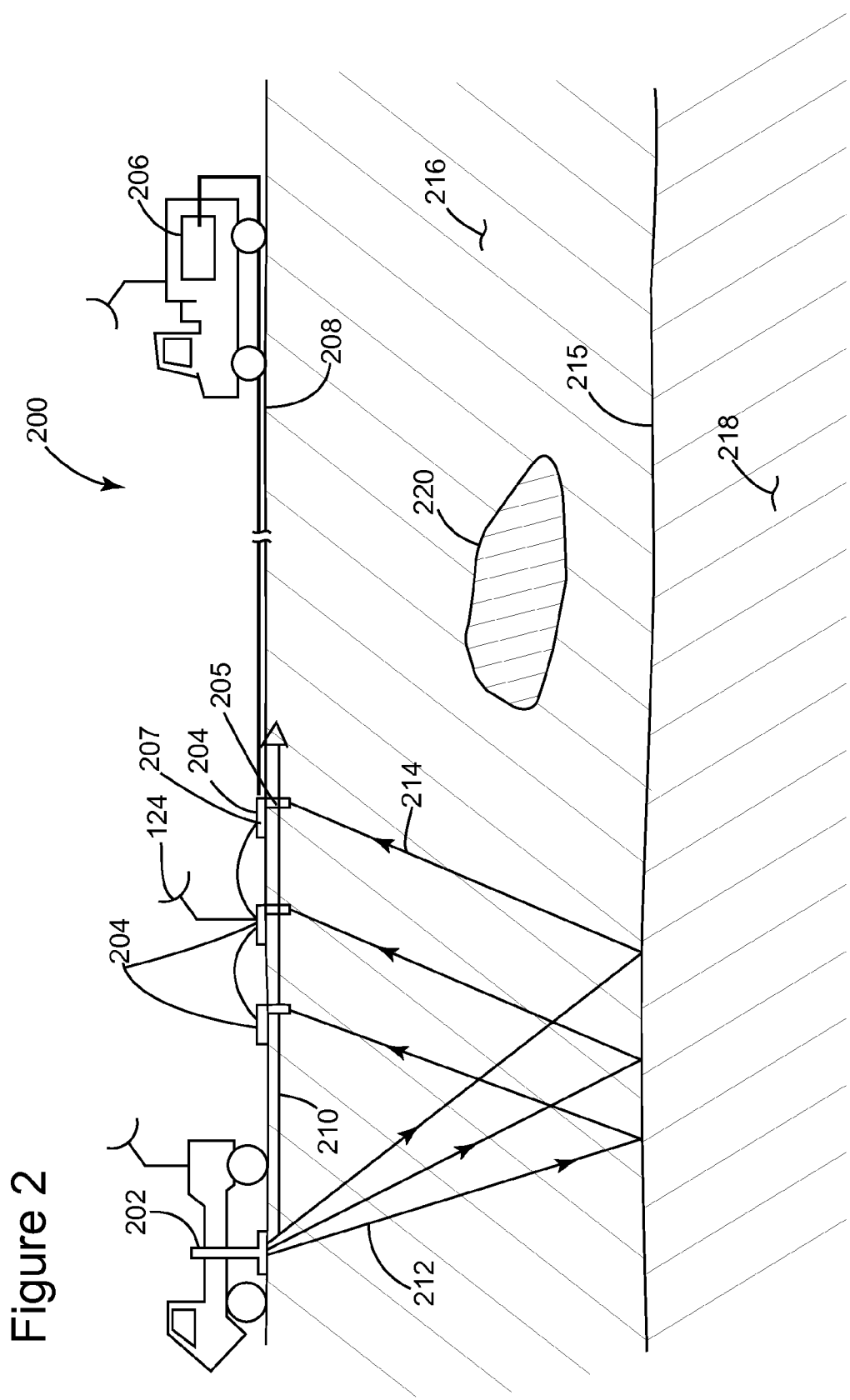

SEISMIC SENSOR CABLE TAKEOUT

PRIORITY INFORMATION

The present application claims priority under 35 U.S.C. §119(e) to U.S. Provisional Patent Application Ser. No. 61/810,398, filed Apr. 10, 2013, the entire contents of which are expressly incorporated herein by reference.

TECHNICAL FIELD

The present embodiments relate generally to seismic sensing devices and apparatuses, and more specifically to a cable takeout for a seismic sensor.

BACKGROUND

During seismic exploration operations, a seismic signal is propagated into the earth. Reflections of the signal which occur at the interface of geological layers may be sensed by seismic sensors, such as geophones or hydrophones, and recorded. Information about the underlying geological layers may then be derived from the recordings.

The type of seismic sensor used in a particular exploration operation has depended, in large part, on the location where the sensor may be deployed. In addition to selecting from the well known geophone and hydrophone categories, sub-categories exist within each type of sensor family. For example, geophones are often provided in two configurations which pertain to the manner in which one or more cables are connected to each geophone within a geophone string. In marsh type geophone strings, where a portion of each geophone may be penetrated into the ground with a specialized driving tool to improve the ability of the geophone to sense the reflected seismic signal, the cable is preferably connected in an axial or vertical alignment with the geophone to allow for the tool to more easily engage the geophone. In contrast, for dry land type geophone strings, in which each geophone may be pushed fully or partially into the ground or sit directly on the ground surface, the preferred alignment of the cable with each geophone has been a radial or horizontal alignment in order to reduce or minimize the portion of the cable above the ground surface exposed to the wind and thereby inhibit the creation of potentially error inducing wind noise in the sensor. As may be appreciated from the preceding discussion, the use of different geophone strings for each of these purposes tends to increase inventory costs and logistic complexity.

The above-described differentiation between the various types of geophones has been accompanied, somewhat ironically, by an increased capacity of the various sensing technologies. For example, in the past, the particle sensing capability of geophones has in some cases been provided by relatively bulky gyroscope-based accelerometers. By way of contrast, today, this same capability may be provided, for example, by relatively small MEMS based accelerometers. The miniaturization associated with MEMS sensing technologies and the associated reduction in costs has naturally led to the development and increased use of so-called multi-component type seismic sensors, e.g., sensors which incorporate technologies associated with both geophones and hydrophones. Indeed, today's seismic sensors may incorporate not only both geophone and hydrophone type sensors but also sensors for detecting other types of reflected signals and/or characteristics of the various environments in which the sensor may be used.

With regard again specifically to geophones, some have proposed to use the same geophone in diverse environments by fixing the position of the cable at an angle between the vertical and the horizontal, see e.g., U.S. Pat. No. 8,000,171. Such solutions have been found unacceptable for reasons including that a tension must be applied and maintained to the cable exteriorly of the seismic sensor in order to achieve a desired vertical or horizontal orientation thereof. Among other problems, this tension may induce a torque or other force on the sensor after the sensor has been set thereby causing the sensor to become displaced from its set position or worse, fully decoupled from the ground. The risk of this occurrence is particularly acute if the integrity of the ground is compromised by the presence of mud and/or snow. Moreover, this problem may be further exacerbated by the continued development of multicomponent seismic sensors having less mass and less volume than ever before. These seismic sensors may be even more prone to inadvertent displacement caused by cable tension forces of even a relatively small magnitude. Conversely, cable tension in the cable may actually force the cable to be maintained in a set position. However, over time, the tension in the cable may dissipate, and without this stabilizing force, the sensor may be displaced from a desired set position.

What is needed then is a cable management solution which allows the seismic sensors of today, and tomorrow, to be re-used in different environments or configurations and which can maintain an angle relative to the cable to which it is connected without the application of undue tension thereto.

SUMMARY

An aspect of the embodiments is to substantially solve at least one or more of the problems and/or disadvantages discussed above, and to provide at least one or more of the advantages described below.

According to an exemplary embodiment a device includes a housing in which a seismic sensor module is at least partially housed, a cable connected to the seismic sensor module, and, a takeout through which the cable extends from the housing. The takeout is operable between a first configuration in which the cable extends vertically from the housing and a second configuration in which the cable extends horizontally from the housing.

According to another exemplary embodiment a seismic sensor has at least first and second discrete and selectable angles at which a single cable is extendable therefrom.

According to another exemplary embodiment a seismic sensing apparatus includes a housing having an axis associated therewith and a seismic sensor module at least partially housed by the housing. A takeout associated with the housing for a cable electrically connectable to the seismic sensor module has a first configuration whereby the cable is extendable from the housing at a first angle relative to the axis and a second configuration whereby the cable is extendable from the housing at a second angle relative to the axis, the first configuration and the second configuration being mutually exclusive.

BRIEF DESCRIPTION OF THE DRAWINGS

The above and other aspects and features of the embodiments will become apparent and more readily appreciated from the following description of the embodiments with reference to the following figures, wherein like reference numerals refer to like parts throughout the various figures unless otherwise specified, and wherein:

FIG. 1 shows a partial cutaway view of a seismic sensor with a takeout;

FIG. 2 shows a background art seismic sensor string;

FIG. 3 shows a top view of the takeout shown in FIG. 1;

FIG. 4 shows a cross-sectional view of the takeout shown in FIG. 1;

FIG. 5 shows an elongated member for use with the takeout shown in FIG. 1;

DETAILED DESCRIPTION

Figure 6:
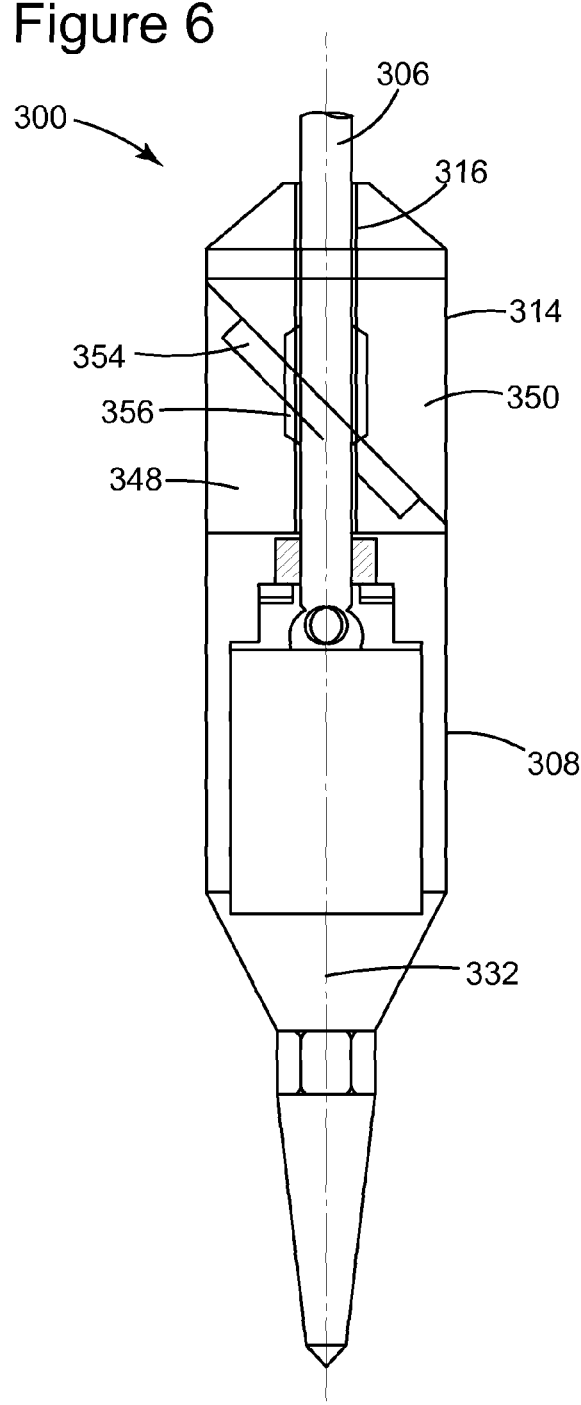
FIG. 6 shows a partial cut-away view of another seismic sensor with a takeout.

The embodiments are described more fully hereinafter with reference to the accompanying drawings, in which embodiments of the novel concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be complete, and will convey the scope of the associated concepts to those skilled in the art. It will be apparent to one skilled in the art, however, that at least some embodiments may be practiced without one or more of the specific details described herein. In other instances, well-known components or methods are not described in detail or are presented in simple block diagram format in order to avoid unnecessarily obscuring the embodiments. The scope of the embodiments is therefore defined by the appended claims. The following embodiments are discussed, for simplicity, with regard to the terminology and structure of a land seismic exploration system, but are not necessarily limited thereto.

Reference throughout the specification to "one embodiment" or "an embodiment" means that a particular feature, structure, or characteristic described in connection with an embodiment is included in at least one embodiment of the present embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

As mentioned above in the Background section, it would be desirable to overcome some of the various problems and difficulties associated with conventional seismic sensors. Embodiments address this challenge by, among other things, providing a seismic sensor having at least first and second discrete and selectable angles at which a cable is extendable therefrom.

An exemplary embodiment of such a seismic sensor 100 is shown in FIG. 1. Seismic sensor 100 provides at least first and second discrete and selectable angles 102 and 104 at which a cable is extendable therefrom. As will be further described herein, sensor 100 obviates the need for a tensile force on the cable 106 upstream of the sensor to maintain a selected cable angle. Among other benefits, this solution provides a seismic sensor 100 which is adaptable for use in a variety of environments, including the aforesaid marsh type and dry land environments, and which is also freed from the potential of being displaced and/or decoupled from the ground by forces which, in the past, were used to maintain a seismic cable at a desired angle.

FIG. 2 shows a system 200 in which a seismic sensor according to the present invention, such as the seismic sensor 100 shown in FIG. 1, may be used. System 200 includes seismic signal source equipment 202 operable to generate seismic signals. Such equipment may incorporate vibratory devices, explosives, weight drop machinery, air guns, etc. System 200 also includes a set of seismic sensors 204 for receiving and converting seismic signals into electrical signals and recording equipment 206 for recording the electrical signals generated by the sensors 204. As further shown in FIG. 2, each of the source equipment 202, sensors 204 and the recording equipment 206 are positioned at or relatively near the surface of the ground 208.

Source equipment 202 may be operated to generate a seismic signal designed to locate a body 220 of oil or gas 220. Typically, the signal propagates firstly on the surface of the ground, in the form of surface waves 210, and secondly in the subsoil, in the form of transmitted waves 212. Transmitted waves 212 generate reflected waves 214 upon reaching an interface 215 between two geological layers 216 and 218. In a relatively solid medium, the transmitted waves 212 may be a combination of P-waves, i.e., pressure waves, and S-waves, i.e., shear waves. P-waves pass through the media causing localized volumetric changes therein. In contrast, S-waves produce a localized distortion in the media with corresponding particle motion but without any net volumetric change. Seismic sensors 204 may be configured as multicomponent sensors capable of receiving and converting both P-waves and S-waves. Each sensor 204 shown in FIG. 2 is coupled to the ground with a portion 205 penetrating the ground and a portion 207 laying on top of the ground. Embodiments described herein provide an improved cable management solution which may help to maintain each sensor 204 in position, e.g., coupled to the ground, regardless of whether the sensor or any part thereof is below or above ground.

Referring again to FIG. 1, seismic sensor 100 includes a housing 108 in which cable 106 is electrically connected to a sensor module 110. Sensor module 110 may be configured to provide P-wave sensitivity, S-wave sensitivity, or both, i.e, multicomponent sensitivity. Seismic sensor 100 further includes a takeout 114 through which cable 106 extends from housing 110. As shown in FIGS. 3 and 4, takeout 114 has a generally frustoconical shape with first and second passageways 116 and 118 being defined within a generally planar slot 120 extending from a longitudinal axis 122 of the takeout to the periphery 124 thereof. As shown in FIG. 1, when seismic sensor 100 is in a first configuration, cable 106 may extend through first passageway 116 and when seismic sensor 100 is in a second configuration, cable 106 may extend through second passageway 118.

Takeout 114 may be operable between the aforesaid first and second configurations without disconnecting electrical cable 106 from sensor module 110. For example, takeout 114 may be provided with a removable guide disposed between the first and second passageways 116 and 118. In the embodiment of FIGS. 1 and 3-5, a removable guide is provided in the form of an elongate member 126 (FIG. 5), e.g., a peg, which is removable from a corresponding through hole 128 (FIGS. 3 and 4) extending to both sides of groove 120 in takeout 114. As shown by the dashed line in FIG. 5, member 126 may optionally be provided with a handle 130.

During operation of takeout 114, member 126 may be removed from hole 128, thereby allowing for cable 106 to be moved from the first passageway 116 to the second passageway 118, or vice versa. Member 126 may then be replaced in hole 128 to complete the operation. The ease with which cable 106 may be moved between different predetermined angles established by passageways 116 and 118 provides a more versatile seismic sensor adaptable to a variety of environments. For example, cable 106 may extend vertically from housing 108 when sensor 100 is intended to be used in a marsh type environment and cable 106 may extend horizontally from housing 108 when sensor is intended to be used on dry land. Of course, other angles or additional angles are possible, for example, groove 120 may extend from one side of takeout 114 to the other thereby allowing for multiple holes each receiving a respective guide member. Possible cable angles may therefore range from zero to one hundred eighty degrees relative to takeout axis 122.

As may be further appreciated from FIGS. 1 and 3-5, when member 126 is within hole 128, cable 106 is maintained at the desired angle 102 or 104 relative to the takeout axis 122 without any tension being applied to cable 106 upstream of the sensor 100. As further shown in FIG. 1, axis 122 is also coincident with axis 132 of the housing as well as an axis 136 of sensor probe 134. The coincidence of these axes may facilitate the use of a tool (not shown) for driving the probe into any type of penetrable ground material, for example, and as discussed in the background section above, the relatively soft ground of a marsh type environment. Also, since no residual tension is necessary on cable 106 to maintain the desired vertical (coaxial) angle thereof, field personnel may potentially apply less force to sensor 100 to create a satisfactory coupling between the ground and the probe 134. Field personnel may also apply less setting force to sensor 100 due to an improved confidence that the sensor is less likely to become displaced by tensile forces necessary to maintain the cable vertically (or horizontally), or by the loss of equilibrium associated with the dissipation of such forces.

As further shown in FIG. 1, sensor 100 may also be provided with a combination weather proof seal and strain relief clamp 138 between takeout 114 and housing 108. Takeout 114 may further include an axially extending skirt portion 140 having a threaded surface 142 to complement a corresponding threaded surface 144 of housing 108. An O-ring 146 may be included therebetween to further seal the interior of housing 108. Threaded surfaces 142 and 144 facilitate the removal of takeout 114 from housing 108 thereby allowing for the interchange of sensor modules 110 and/or takeouts 114 to sensor 100. Of course, the complementary threaded surfaces 142 and 144 of takeout 114 and housing 108 are exemplary and myriad other configurations are possible for allowing takeout 114 and housing 108 to be disconnected from and connected to each other, such configurations facilitating not only parts interchange, but also inspection and/or repair of any component of sensor 100.

Figure 7:
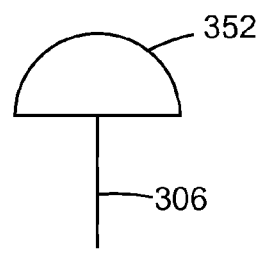
FIG. 7 shows schematically a range of angles and directions associated with a cable extending from the seismic sensor shown in FIG. 6.

FIG. 6 shows another exemplary embodiment of a seismic sensor 300 according to the present invention. Sensor 300 includes a takeout 314 having a first portion 348 and a second portion 350, the second portion being rotatably connected to the first portion 348 along a plane oriented at 45 degrees relative to the longitudinal axis 322 of takeout 314. During operation, second portion 350 may be rotated relative to first portion 348 to select an angle at which cable 306 may extend from takeout 314, the angle ranging between axial coincidence, i.e. zero degrees, and fully radial, i.e. ninety degrees, relative to the longitudinal axis 332 of housing 308. As an additional option, first portion 348 may be rotatably connected to housing 308 in a plane perpendicular to the longitudinal axis 322 of housing 308. During operation, first portion 348 may be rotated relative to housing 308 to select the direction at which cable 306 may extend from takeout 314. Thus, as represented schematically in FIG. 7, takeout 314 may be operable to define a hemispherical range 352 of angles and directions at which cable 306 may be extended therefrom. As further shown in FIG. 6, relief cavities 354 and 356 may be formed in first and second portion 348 and 350 to allow the cable to bend more easily during rotation of the first and second portion 348 and 350. Additionally, cable 306 and takeout 314 may be further configured to facilitate bending, and also, inhibit twisting, of cable 306 during operation of takeout 314, for example, by the application of a dielectric lubricant between cable 306 and takeout 314. Sensor 300 may allow field personnel to more easily position, e.g., couple, sensor 300 to the ground during deployment since cable angle and, optionally, cable direction, may be selectable both before and after sensor 300 has been set in position.

Figure 8:
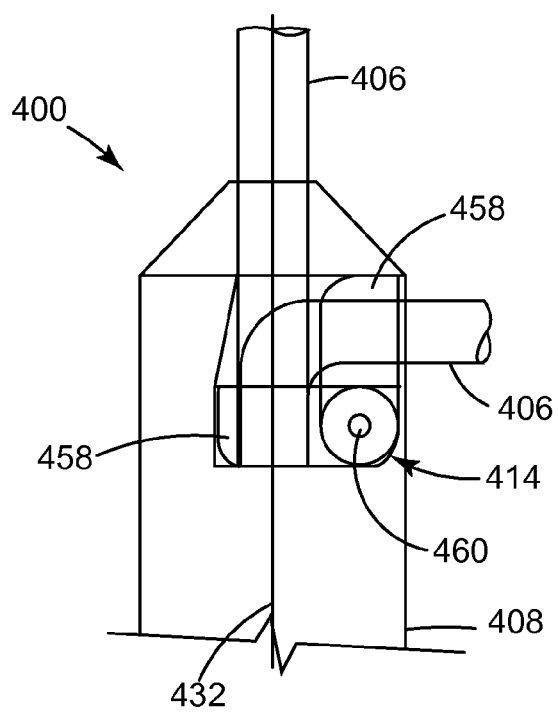
FIG. 8 shows a partial cut-away view of another seismic sensor with a takeout.
Figure 9:
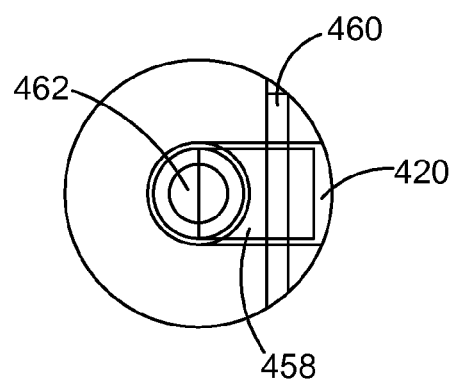
FIG. 9 shows a cross-sectional view of the takeout shown in FIG. 8.

FIGS. 8 and 9 show another exemplary embodiment of a seismic sensor 400 according to the present invention. Sensor 400 includes a takeout 414 defining a member 458 which is rotatable about a hinge 460 in slot 420. Member 458 includes a hole 462 through which cable 406 extends. As shown in FIGS. 8 and 9, when takeout 414 is in a first configuration, member 458 is perpendicular to the longitudinal axis 432 of housing 408 and cable 406 extends from housing 406 coincident with the longitudinal axis 432 thereof. To operate takeout 414 from the first configuration to a second configuration, the member 458 may be rotated to extend parallel to the longitudinal axis 432 of housing 408. This rotation may be effected by applying a torque about hinge 460, for example, with a tool inserted through a slot or recess in member 458 (not shown), until cable 406 extends radially relative to the longitudinal axis of housing 408. A similar process may be employed to operate takeout 414 from the second configuration to the first configuration. Housing 408 may also be further configured to prevent inadvertent rotation of takeout 414 from the first or second configuration, for example, by a detent mechanism (not shown) or, as another example, by an interference type frictional engagement between the surface of slot 420 and the surface of member 458.

Figure 10:
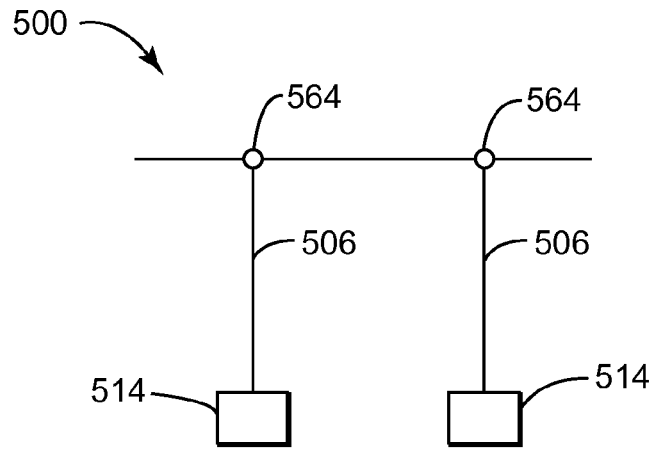
FIG. 10 shows a schematic view of a sensor string according to an embodiment.
Figure 11:
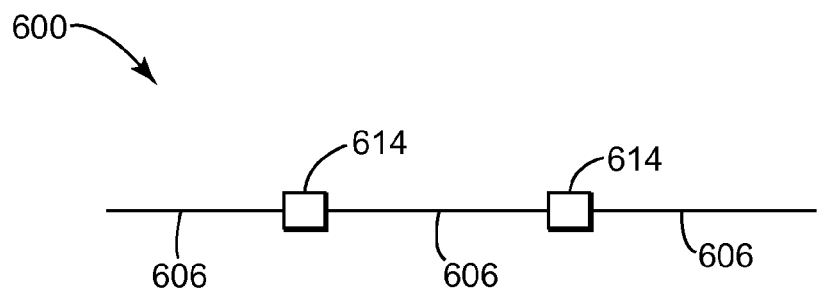
FIG. 11 shows a schematic view of a sensor string according to another embodiment; and, FIG. 12 shows a schematic view of a sensor string according to yet another embodiment.
Figure 12:
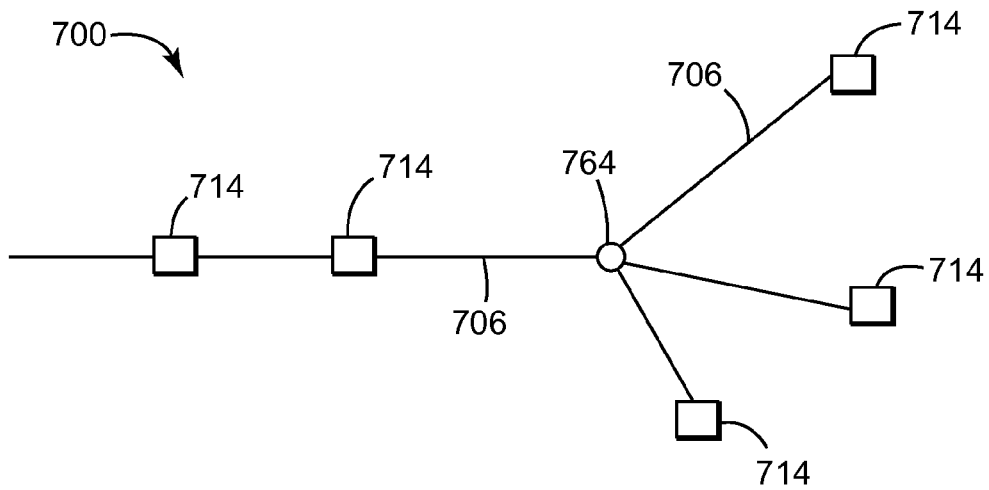

In each of the discussed embodiments, a single cable has been shown to extend from each seismic sensor. Accordingly, FIG. 10 shows a schematic view of a sensor string 500 in which a single cable 506 may extend from each sensor 514 to a respective node 564 along a seismic sensor string 500. Alternatively, and as shown in FIG. 11, multiple cables 606 may pass through the takeout of each disclosed sensor 614 such that a daisy chain configuration 600 of sensors may be provided. FIG. 12 shows a hybrid configuration of a seismic sensor string 700 including sensors 714 being connected in a daisy chain configuration with multiple cables 706 extending from each sensor as well as sensors 714 each having a single cable extending to a single node in a hub and spoke type arrangement.

Numerous variations and modifications of the afore-described embodiments are possible and contemplated. The disclosed embodiments provide a seismic sensor with an adjustable takeout. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of the embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

What is claimed is:

1. A device comprising:
   a housing in which a seismic sensor module is at least partially housed;
   a cable connected to said seismic sensor module; and,
   a takeout through which said cable extends from said housing, said takeout being operable between a first configuration in which said cable extends vertically from said housing and a second configuration in which said cable extends horizontally from said housing,
   wherein said takeout further comprises first and second passageways, said cable being in said first passageway when said cable takeout is in said first configuration, and said cable being in said second passageway when said cable takeout is in said second configuration, and
   wherein said takeout further comprises a removable guide disposed between said first and second passageways, said guide maintaining said cable in said first passageway when said takeout is in said first configuration and said guide maintaining said cable in said second passageway when said takeout is in said second configuration.

2. The device of claim 1, wherein a connection between said cable and said seismic sensor module is maintained during operation of said takeout between said first configuration and said second configuration.

3. The device of claim 1, wherein said guide is an elongate member removably received in a hole extending in said takeout between said first and second passageways.

4. The device of claim 1, wherein said takeout is operable between said first configuration and said second configuration by removing said guide from between said first and second passageways, moving said cable from said first or second passageway into the other of said first or second passageway and replacing said guide between said first and second passageways.

5. The device of claim 1, wherein said takeout is connected to said housing.

6. The device of claim 5, wherein a combined seal and a cable strain reliever are disposed between said takeout and said housing.

7. The device of claim 1, wherein said takeout is rotatively operable between said first configuration and said second configuration.

8. The device of claim 7, wherein said takeout comprises a first portion and a second portion rotatably connected to said first portion along a plane oriented at forty-five degrees relative to said longitudinal axis of said housing.

9. The device of claim 8, wherein said takeout defines a single passageway for said cable to extend from said housing.

10. The device of claim 9, wherein said takeout defines a hemispherical range of angles and directions at which said cable may extend from said housing.

11. The device of claim 7, wherein said takeout comprises a member hingedly connected to said housing, said member having a through hole through which said cable extends.

12. The device of claim 10, wherein when said takeout is in said first configuration, said member is horizontal and when said takeout is in said second configuration, said member is vertical.

13. The device of claim 10, wherein said housing includes a channel in which said member is rotatable about said hinge.

14. The device of claim 10, wherein said hinge is transverse to a plane defined by said channel.

15. A seismic sensing apparatus, said apparatus comprising;
   a housing having an axis associated therewith;
   a seismic sensor module at least partially housed by said housing;
   a takeout associated with said housing for a cable connectable to said seismic sensor module, said takeout having a first configuration whereby said cable is extendable from said housing at a first angle relative to said axis and a second configuration whereby said cable is extendable from said housing at a second angle relative to said axis, said first configuration and said second configuration being mutually exclusive,
   wherein said takeout is rotatively operable between said first configuration and said second configuration, and
   wherein said takeout comprises a first portion and a second portion rotatably connected to said first portion along a plane oriented at forty-five degrees relative to said longitudinal axis of said housing.

* * * * *